(12) United States Patent
Cunningham

(10) Patent No.: US 7,761,451 B2
(45) Date of Patent: Jul. 20, 2010

(54) EFFICIENT QUERYING AND PAGING IN DATABASES

(75) Inventor: Conor Cunningham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 11/156,148

(22) Filed: Jun. 17, 2005

(65) Prior Publication Data

US 2006/0287978 A1    Dec. 21, 2006

(51) Int. Cl.
*G06F 7/00* (2006.01)
*G06F 17/30* (2006.01)

(52) U.S. Cl. .................................. 707/736; 707/741
(58) Field of Classification Search .............. 707/3–5, 707/104.1, 7
See application file for complete search history.

(56) References Cited

U.S. PATENT DOCUMENTS

| | | | |
|---|---|---|---|
| 6,044,216 A * | 3/2000 | Bhargava et al. | 717/114 |
| 6,285,998 B1 * | 9/2001 | Black et al. | 707/4 |
| 6,578,046 B2 * | 6/2003 | Chang et al. | 707/103 R |
| 2002/0029211 A1 * | 3/2002 | Bonner et al. | 707/3 |
| 2003/0200206 A1 * | 10/2003 | de Judicibus | 707/3 |
| 2008/0201313 A1 * | 8/2008 | Dettinger et al. | 707/4 |

\* cited by examiner

*Primary Examiner*—Wilson Lee
*Assistant Examiner*—Angela M Lie
(74) *Attorney, Agent, or Firm*—Workman Nydegger

(57) ABSTRACT

The claimed subject matter provides a system and/or a method that facilitates paging and/or cursoring over the results of a query associated with a file storage system. An interface component can receive the query targeted to the file storage system including at least one key that relates to data. A query component can enable cursoring over a query operation on a query result utilizing the key in order to provide an extended set of query operators.

12 Claims, 10 Drawing Sheets

EFFICIENT QUERYING AND PAGING IN DATABASES

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example. As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. Database applications allow the user to compare, sort, order, merge, separate and interconnect the data, so that useful information can be generated from the data. Capacity and versatility of databases have grown incredibly to allow virtually endless storage capacity utilizing databases. However, typical database systems offer limited query-ability based upon time, file extension, location, and size. For example, in order to search the vast amounts of data associated to a database, a typical search is limited to a file name, a file size, a date of creation, etc., wherein such techniques are deficient and inept.

With continuing and increasing creation of data from end-users, the problems and difficulties surrounding querying, finding, relating, manipulating, and storing such data can escalate. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. When obtaining such data, the data needs to be stored. In other words, the problems and difficulties surrounding querying, finding, relating, manipulating, and storing data affect both the developer and the end user.

In particular, with the vast amounts of data surrounding users and/or developers, querying data has grown into a difficult task to accomplish efficiently. The navigation and/or presentment of data on a display device surround numerous applications, wherein database cursoring is relied upon heavily. Various operations associated with cursoring and/or paging are extremely limited in connection with databases and/or applications. The conventional techniques associated with paging over query results are inefficient, costly in processor time, time consuming, and inconsistent.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate paging and/or cursoring results of a query associated with data. An interface can receive a query, wherein a query component can enable cursoring over any set of query operations on the query result, and a key can be surfaced and/or manufactured from the original data. The query component can generate and/or derive a key that can be utilized for a query and then a cursor on the query results. In other words, the query component provides cursoring on query results associated with a file storage system utilizing an advanced key that extends query operators. The operators that can be utilized can include operators that generate keys in their output (e.g., Rollup, Group By, Sequenced Functions, . . . ) in addition to operators that maintain keys from their input (e.g., join, filter, projection, . . . ).

Moreover, an application can utilize the extended query operators provided by the query component. In particular, the application can provide a query to the query component via the interface, wherein the query component can utilize the key to enable cursoring with extended operators on the query result. The application can be any suitable application capable of querying, paging, and/or cursoring data within the file storage system. For instance, the application can be a client database application (e.g., email clients, file system clients, database applications, pure database applications, . . . ), and a web application (e.g., online catalogs that display pages of data, . . . ).

In accordance with one aspect of the claimed subject matter, the query component can include an advanced key generator. The advanced key generator can derive and/or generate keys over a logical query processor operation tree to provide efficient cursoring of query results associated with the file storage system. The efficient cursoring of query results can include the implementation of advanced operators, wherein the operators included are operators that generate keys in their output and operators that maintain keys in their input. In particular, the advanced key generator can utilize a key column to define row currency without allocating the file storage system resource and/or a server resource.

In accordance with another aspect of the claimed subject matter, the query component can further include a row position component. The row position component can determine the logical domain row currency with the query result. The row position component can map a three-valued logic in a query into a two-valued representation of values utilized in a sort order. Furthermore, the row position component can utilize the two-valued representation to compare keys associated with columns with the file storage system. In other aspects of the claimed subject matter, methods are provided that facilitate paging and/or cursoring query results.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
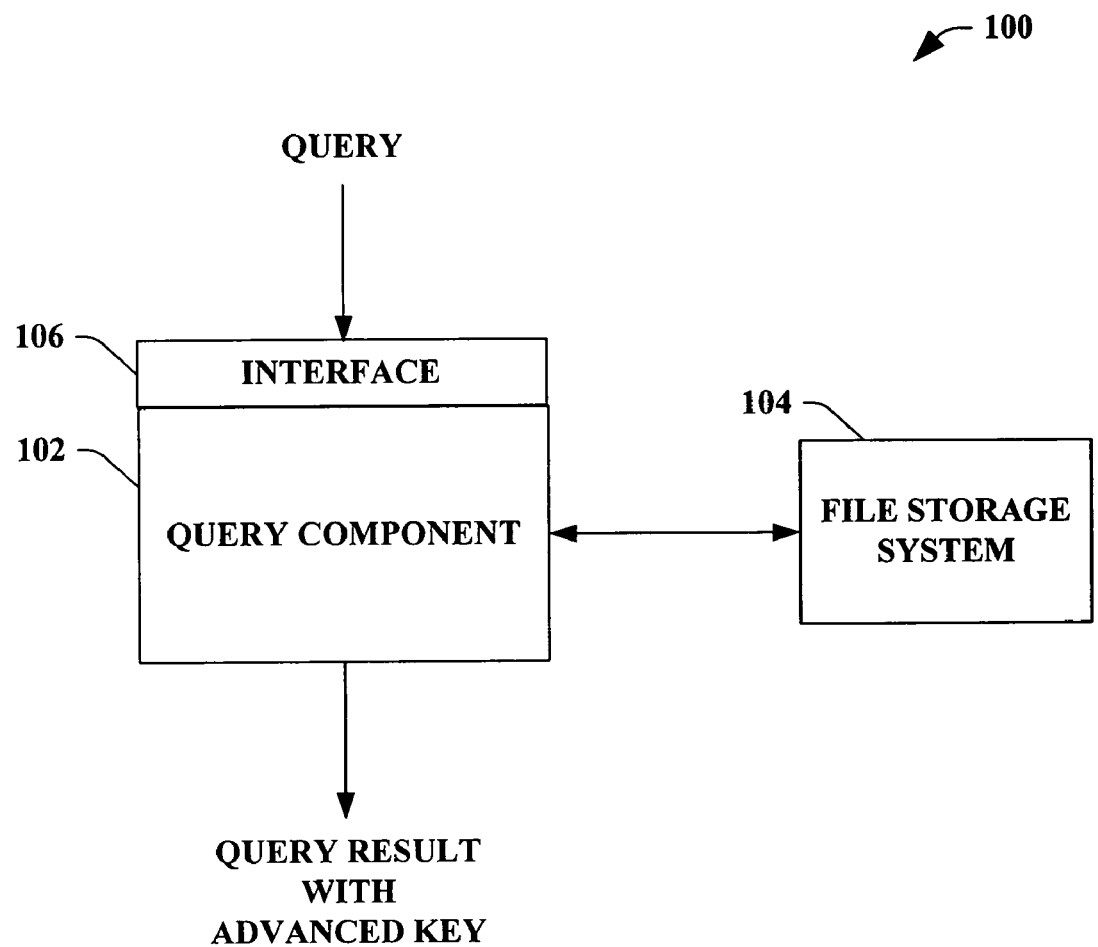
FIG. 1 illustrates a block diagram of an exemplary system that facilitates efficiently paging over query results associated with a file storage system.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates efficiently paging over query results associated with a file storage system. A query component 102 can provide efficient cursoring and/or paging on a query result associated with a file storage system 104. The file storage system 104 can be any suitable file system such as, but not limited to, a database system, an object relational database system, a database-based file storage system (e.g., wherein the representation of information can be defined as complex types), structured data system, unstructured data system, etc. The query component 102 can enable cursoring over any suitable set of query operations on which a key can be surfaced and/or manufactured from the original data (e.g., the data within the file storage system 104 on which the query results relate therewith). By providing such efficient cursoring over any set of query operations, the set of supported query operators can be extended to include operators that generate keys in output (e.g., Rollup, Group By, Sequenced Functions, . . . ) in addition to operators that maintain keys from input (e.g., join, filter, projection, . . . ). In other words, the query component 102 can generate a query result with an advanced key, wherein the advanced key can be derived for an initial query and utilized to cursor (e.g., page and/or query the result of an initial query) the query result. By utilizing the query component 102 to efficiently cursor the query result related to the file storage system 104, better paging and/or cursoring performance and scaling to large numbers of cursors can be achieved. It is to be appreciated that the query result with the advanced key can be utilized by any entity and/or user in order to cursor and/or page query results related to the file storage system 104.

For example, a user can query a database, wherein such query results can include a key that facilitates associating data with the query. The query results can be a sub-set of the database, wherein the user may want to page and/or cursor such results. The query component 102 facilitates cursoring the query results by allowing the key that relates to the original database and/or query to be utilized for the cursoring of the query results. The use of the query with advanced key expands the supported query operators to include operators that generate keys in their output in addition to operators that maintain keys from their input.

Furthermore, the query component 102 can provide the maintenance of row currency (e.g., position, . . . ). The query component 102 can maintain the logical domain row currency without the implementation of a temporary table (e.g., storing resulting base table keys to be visible through all operators). Without involving the temporary table, the query component 102 minimizes the amount of resources that are utilized to achieve cursoring and/or paging functionality (e.g., bookmark positioning, forward scrolling, backward scrolling, complete set of query operators, . . . ).

Moreover, the system 100 can include any suitable and/or necessary interface component 106, which provides various adapters, connectors, channels, communication paths, etc. to integrate the query component 102 into virtually any operating and/or database system(s). In addition, the interface component 106 can provide various adapters, connectors, channels, communication paths, etc., that provide for interaction with the query component 102, and the file storage system 104.

Figure 2:
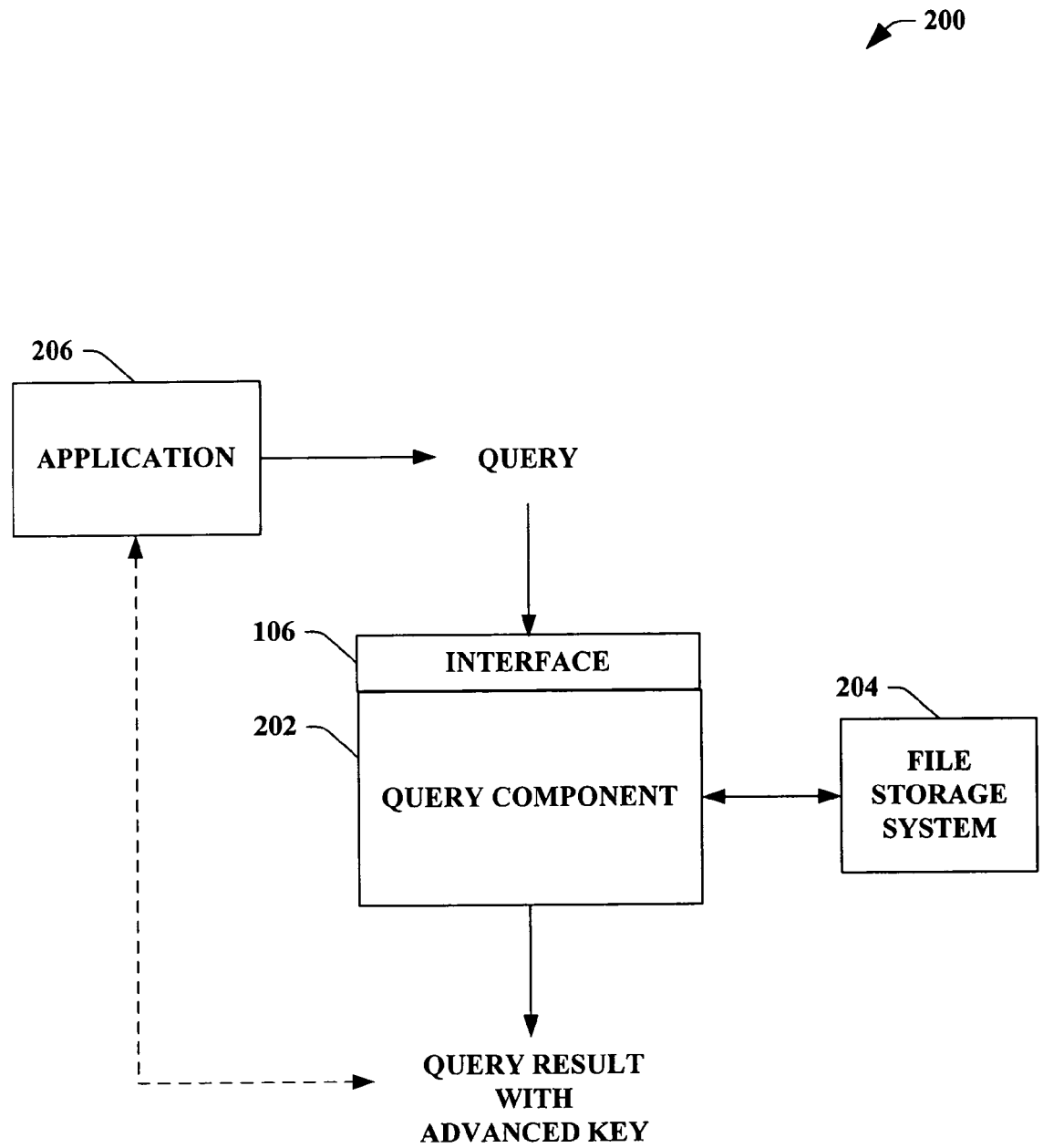
FIG. 2 illustrates a block diagram of an exemplary system that facilitates enabling an application to cursor over results of a query utilizing a key associated with original data.

FIG. 2 illustrates a system 200 that facilitates enabling an application to cursor over results of a query utilizing a key associated with original data. A query component 202 can enable cursoring and/or paging on a query result that is a sub-set of data associated with a file storage system 204. The query component 202 invokes cursoring over any set of query operations (e.g., Rollup, Group By, Sequenced Functions, join, filter, projection, . . . ) on which a key can be surfaced and/or manufactured from the original data within the file storage system 204. In other words, the query component 202 allows a key associated with at least one of the file storage system 204 and the query to be utilized for cursoring and/or paging of such query results. The query component 202 provides a query result with an advanced key (e.g., a key that is utilized for the query of the file storage system 204 and the cursoring and/or paging of the query result) that extends the set of supported query operators to achieve better performance and scaling to a plurality of cursors. It is to be appreciated that the query component 202 and the file storage system 204 can be substantially similar to the query component 102 and the file storage system 104 as depicted in FIG. 1.

An application 206 can be implemented with the system 200, wherein the application can provide a query to the query component 202 and/or cursor the query result utilizing the query result with advanced key. It is to be appreciated and understood that the application 206 can be any suitable application capable of querying the file storage system 204 and/or cursoring/paging the query results. For instance, the application can be, but is not limited to, client database applications (e.g., email clients, file system clients, database applications, pure database applications, . . . ), and web applications (e.g., online catalogs that display pages of data, . . . ). In addition, although FIG. 2 depicts a single application 206, it is to be appreciated that the claimed subject matter is not so limited and any number of applications can be utilized.

The query component 202 can enable cursoring and/or paging of query results by utilizing a key for a query on the file storage system and the key for a cursor on the query result. Such technique provides the extension of any suitable query operation to be implemented in an efficient manner (e.g., efficient in both time and storage resources). For example, a number of different conventional cursoring technologies exist, each with differing functionality and performance characteristics that are far inept in comparison to the claimed subject matter. A forward-only cursor can only retrieve rows sequentially. While its functionality is extremely limited, it can be, at times, fairly fast and can work over a large set of queries. "Dynamic" cursors, on the other hand, allow forward and backward scrolling as well as storing a bookmark and re-positioning on such bookmark. This functionality is much more difficult to provide, and it is limited to a small set of query operations (e.g., join, filter, projection, . . . ) that do not change row currency on the source table(s). These can also be relatively fast. Keyset cursors work on a larger set of queries but require that base table key(s) be visible through all operators. The resulting keys can be stored in a temporary table. It supports bookmarked positioning, forward/backward scrolling, and works on an inadequate and incomplete set of query operators. Creating the temporary table, however, is very expensive in both time and storage resources. Set membership is usually restricted in this model, however, as the keyset is built—exogenous row insertions and deletions may not be seen by this cursor model. The key trade-offs include performance, memory and disk footprint, supported query operators, supported scrolling operations, and visibility of changes to the original data set. Yet, by utilizing the query component 202, the conventional cursoring techniques are far surpassed in efficiency, accuracy, and/or performance.

Figure 3:
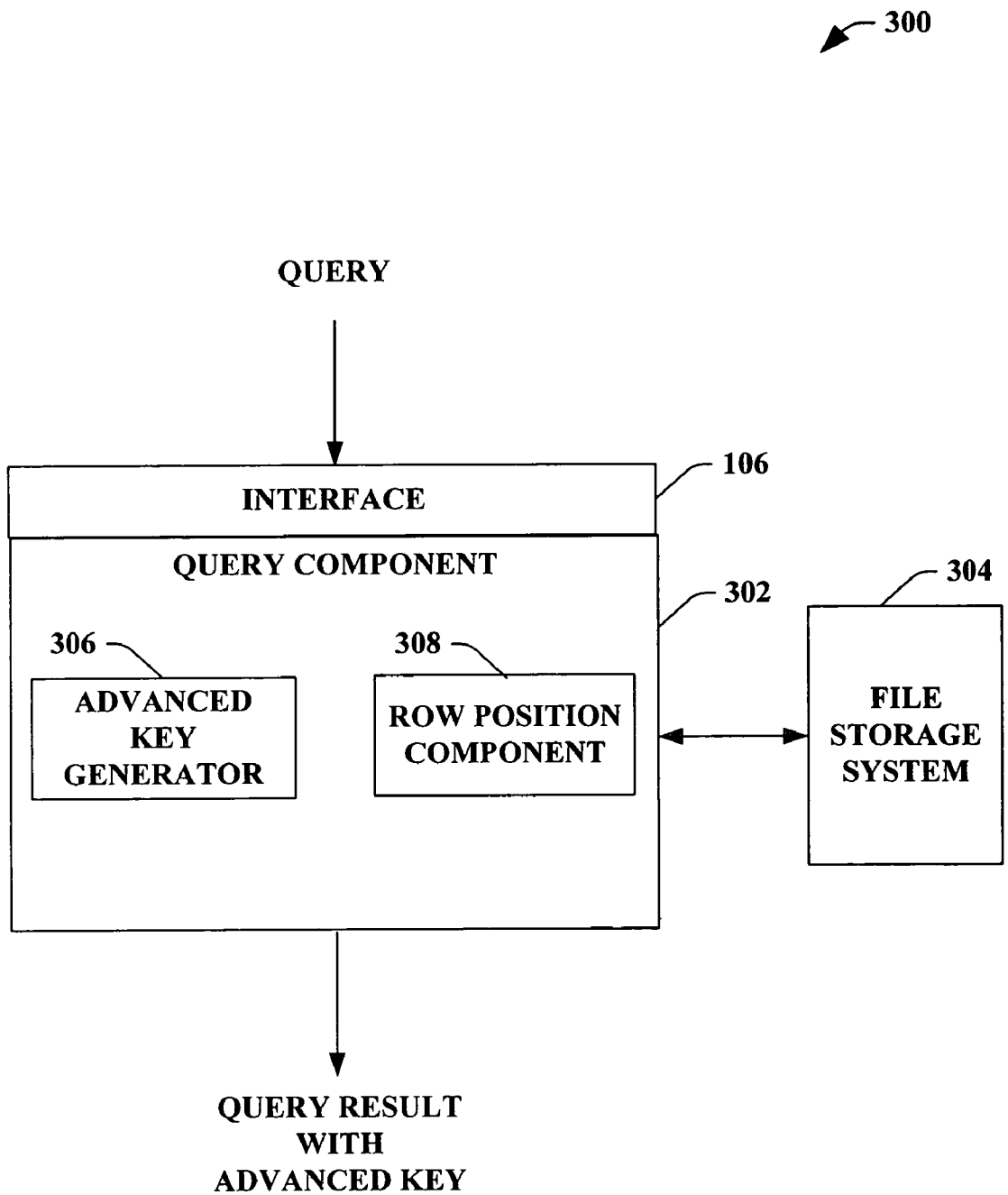
FIG. 3 illustrates a block diagram of an exemplary system that facilitates enabling an efficient cursoring and/or paging of a query results associated with a file storage system.

FIG. 3 illustrates a system 300 that facilitates enabling an efficient cursoring and/or paging of a query results associated with a file storage system. A query component 302 can enable cursoring and/or paging on a query result associated with a file storage system 304, wherein a key utilized for the query can be utilized to cursor such result. In other words, the query component 302 enables cursoring over any set of query operations on which a key can be surfaced and/or manufactured from the original data. The query component 302 extends the set of supported query operators to include operators that generate keys in their output (e.g., Rollup, Group By, Sequence Functions, . . . ) in addition to operators that maintain keys from their input (e.g., join, filter, projection, . . . ). The query component 302 can utilize an advanced key with the query result to allow any suitable entity and/or user to cursor such query results efficiently. It is to be appreciated that the query component 302 and the file storage system 304 can be substantially similar to the query component 202, 102 and the file storage system 204, 104 of FIGS. 2 and 1 respectively.

The query component 302 can include an advanced key generator 306 that can create the advanced key utilized to provide the extended query operators to cursoring query results associated with the file storage system 304. In general, the advanced key generator 306 can derive and generate keys over logical query process operation trees for more advanced operators. It is to be appreciated that the advanced key generator 306 depicted below is only one implementation of the claimed subject matter and any suitable variation is to be considered with the disclosed innovation.

Many query processors accept, for example, Standard Query Language (SQL) as input and process commands as internal query trees. Within a query processor (not shown), a query optimizer (not shown) can be responsible for finding an efficient execution plan to satisfy the user request. Modern query optimizers can contain one or more property derivation phases to help efficiently consider possible plans. For example, one such property could capture whether the output of an operator is sorted (and on which columns). Another useful property can capture whether the output of each operator is unique on any (set of) column(s)—alternatively, whether these columns form a "key". This property can be useful in simplifying some query operations and other optimizations. Moreover, this property can be useful functionally, as it determines whether there can be a key that can be used in a "keyset cursor", as defined above. The claimed subject matter utilizes the extension of this property for use in more advanced operators and has a number of useful applications in cursoring and/or paging elsewhere in database and/or file storage systems. The advanced key generator 306 extends key property derivation to create derived keys from the original key through operators while exactly preserving the original key.

For example, a basic query compilation pipeline is illustrated below:

SQL→PARSE→BIND→OPTIMIZE→FINAL PLAN

The standard algorithms utilized to determine the key of the results of a query attempts to determine if the key(s) from the base table(s) are visible through the query operations that are performed on the table. Many query and/or relational operations, however, do not maintain keys from their inputs. As a result, the set of queries that define keys on its output can be relatively small. As an example, a SQL Server query processor can support key propagation on only the most common operations such as filter, join, project, and table scan/index operations. Other operations, including UNION/UNION ALL, GROUP BY, ROLLUP, and others do not necessarily expose keys from their inputs as keys in their outputs. The advanced key generator 306 can generate a key for the purpose of identifying rows and their relative position to each other in the final presentation order, wherein significantly more queries can support more advanced cursor operations.

For instance, the operator GROUP BY can be implemented using a special grouping operator in the query processor. It is an example operation that can fabricate a key in its output for use in cursor operations. By definition, the GROUP BY operation generates one output row for each distinct set of values of a given set of columns. For example, "SELECT * FROM T1 GROUP BY col1" can generate a single output row for each distinct value of col1 in T1. It is to be appreciated that NULL can be considered a "distinct value" in this context and a single row can be generated for all NULL values. This knowledge can be combined with the ability to propagate key information for existing operators supported in cursors (e.g., join, filter, project, table scan, . . . ) to generate a key over the output of the query. The advanced key generator 306 can allow operations that can "generate" a key, instead of merely propagate keys, to enable paging (discussed infra).

The advanced key generator 306 can apply to a number of query processing operations that do not exist as a single syntax construct in the SQL and/or any other suitable query language. For example, SQL Server supports an internal Rollup operator to support queries using "GROUP BY <column list> WITH ROLLUP". This operation can generate extra "summary" rows for aggregates in a query. For a single column GROUP BY operation, Rollup can generate a NULL value for the grouping column with the results of an aggregate over output rows in the operation. The following can be an example of the above:

```
drop table t1
create table t1(col1 int, col2 int)
insert into t1(col1, col2) values (1, 2)
insert into t1(col1, col2) values (2, 2)
select col1, sum(col2) as col2 from t1 group by col1 with rollup
```

Result:

| col1 | col2 | |
|---|---|---|
| 1 | 2 | |
| 2 | 2 | |
| NULL | 4 | ← Extra row contains sum of other col2 rows |

(3 row(s) affected)

This operation can therefore generate a unique output key if the columns on which the grouping is performed precludes NULLs. (There are other ways to make this operation unique, and this is forwarded simply as an example). As a result, it is possible to uniquely identify the results of a Rollup operation (e.g., assuming all other operations in the tree either preserve or generate a key). The advanced key generator 306 can allow other operations to be supported, and it is expected that a reasonably large set of operations in a modern query processor either natively support key propagation, key generation, or can be trivially modified to generate a key for the purpose of row identification in cursors.

The use of keys in query operator trees can have many applications. For cursoring, the use of this property can define "row identity" —the ability to uniquely identify a row from other rows in the result. Row identity can be satisfied by generating a unique value for each output row (e.g., physical, such as a bookmark, or logical, such as a row number) or by making sure that the output is unique. Depending on the exact implementation choice, different functional behaviors can be supported. For instance, using a logically assigned row number to define row identity gives the ability to identify the position of an element within a set, but it also makes it very difficult to allow insertions to the set over time, as rows may need to be placed between existing, already-numbered rows. Oftentimes, the surfaced programming model can significantly impact the scalability of the application. Applications that use row numbers, for example, can work well in a low-cardinality, single-user environment (e.g., where changes are made by the user), but it performs poorly when confronted with many users inserting and deleting rows while others are attempting to cursor over the results.

The advanced key generator 306 utilizes the key column(s), as defined above, to define row currency without allocating server resources. Since this key is merely a representation of the values from the results of the query, the client can cache this information and use it in subsequent queries without any required server state. Conventionally, a typical server cursor models requires memory allocation, locks, and other resources to be reserved over the lifetime of the cursor—these ultimately reduce overall scalability because server resources will eventually be exhausted if too many cursors are created at once. The advanced key generator 306 can simplify exception cases seen in classic cursor models because row currency is attached to the logical values associated with a row instead of the physical "row" itself. For example, if a user attempts to delete the row while a "classic" server cursor is maintaining positional currency on that row, the deletion either must be prevented (perhaps through database locking) or require the cursor to handle an exception case where currency is lost and must be found again (perhaps by moving to the previous row or re-scanning the table, . . . ). These exception cases can make cursors more difficult for clients to use and/or understand. The advanced key generator 306 removes this problem. Since currency can be based on the logical domain of a column or set of columns presented in a particular order, the subsequent cursor movement can be based on the row's values even if the row has been deleted since the last use of this cursor. This allows the user to program to the cursor model with fewer exception cases to handle and less state stored in a single server.

The query component 302 can further include a row position component 308. In general, the row position component 308 can infer and/or reason about the logical domain row currency (e.g., position) within a query result. Database applications support three-valued logic, meaning that it is possible for a column in a row to either have a value or to have no value. "No value" is typically represented as NULL. NULL values do not compare directly with other values in the column. However, most database engines provide a sort position for NULL values when a SQL query uses an ORDER BY clause. Usually, NULL values are sorted either before or after the "normal" valid values in that data type.

For example, Table 1 below is utilized:

| Col1 |
|---|
| 1 |
| 100 |
| NULL |

SELECT * FROM Table1 ORDER BY col1

| Col1 |
|---|
| NULL |
| 1 |
| 100 |

In the above example, NULL can be sorted lower than all other values in the domain. of col1.)

The row position component 308 can order and/or the values returned from a query. Given that SQL's ORDER BY clause can contain multiple columns that can each be sorted ascending or descending, the problem quickly becomes intractable for the average user to write a query to try to find "the next" row in a sort order. Yet, the row position component 308 provides a mechanism to describe the sort order in a manner that can be easily compared to find out if one row is "before" or "after" another row (or any value) for a any given sort order.

The row position component 308 utilizes a concept and any suitable language to map the three-valued logic in queries (e.g., SQL queries) into a comparable "two-valued" equivalent representation of the values utilized in the sort order. This transformed representation can be used to directly compare two rows or even two sets of values in the domain to determine their relative sort position. The row position component 308 can utilize this concept for implementation in cursors and for use through complex relational operations that would otherwise not preserve key information. The following is an explanation of the applications of this concept.

A two-valued representation allows for very efficient comparisons of keys (e.g., either over a single and/or multiple columns). Conventionally, this is implemented in modern computers using a straight memory comparison to determine which key is less than another key (e.g., memcmp( ) is a common routine that performs such a comparison). As the file storage system 403 and/or databases tend to store many values, making such a primitive operation efficient is essential to the overall performance of the file storage system 304 and/or database system. For instance, the key properties of such an encoding scheme are that it: 1) map 3-valued logic into 2-valued logic (e.g., provide a sort position for NULLs); 2) handle ascending/descending sorts; 3) handle variable-length data; 4) handle multiple columns in a key; and 5) allow for efficient comparisons.

There may be multiple roughly equivalent encodings that can be used by the row position component 308 to satisfy these criteria. One such scheme is described here, but it is only described as an example and is not a requirement for the exact encoding used by the claimed subject matter. The following is an example of a sample encoding (e.g., sequence A through E) utilized by the row position component 308.

A) Each data type supported in the file storage system 304 defines a mapping for the valid values in the domain into a binary form that can be memory-compared. Note that the examples can be encoded in, for instance, "big-endian" style so that the least-significant bytes can be compared first using a memory compare operation. The following can be seen as examples of the above:
   1. Unsigned integers—These require no translation for their valid domains—they are already comparable.
   2. Signed integers—Signed integers are generally stored using 2's compliment arithmetic notation (which simplifies some operations). This format stores −1 with bits set to 1. The smallest supported number for a signed data type is 100000 . . . 000. While this format is not natively memory-comparable, it is possible to map it into such a format by converting the value into a different unsigned value that preserves the relative order of the values in the type. The largest supported value would move from 011111 . . . 1111 to 111111 . . . 111, and the smallest value would move from 10000 . . . 000 to 000000 . . . 0000.
   3. Strings—The row position component 308 can convert strings into efficiently-comparable binary values that implement advanced sorting orders that can optionally support case-sensitivity, accent-sensitivity, etc. These encodings can also be supported for different locales that provide different sorts for each supported language.

The row position component 308 provides these encodings such that the length is not fixed.
   4. Variable Binary data—For this type, one possible encoding utilized by the row position component 308 is to:
      a. After the possible initial NULL determination byte, insert a byte after every N (e.g., perhaps 8) bytes to indicate how many bytes exist in the last group. Specifically, it would encode 0 . . . N in this byte if this was the last byte and a higher value otherwise (e.g., perhaps N+1).
      b. The values in the binary value can be inverted if the sort was descending, including the bytes added in (a).
   5. Other data types—For the sake of brevity, the encoding of any suitable data type is not illustrated. Yet, by utilizing the above examples of data types, one skilled in the art is capable of designing such an encoding scheme for implementation in accordance with the claimed subject matter.

B) Ascending/Descending sorts can be handled by creating a mapping that places the encoded values the opposite order as described in (A). For example, unsigned integers can be encoded using (MAXVALUE-encodedvalue) to achieve this property.

C) Mapping 3-valued logic: NULLs can be handled in a variety of ways based on how it is supposed to sort compared to "normal" values in the domain. NULLs are typically sorted first or last (independent of ascending/descending sort) or "high or low" (not independent of ascending/descending sorts). The "sort low" technique is explained in detail that can be utilized to extend to the other options. For columns that support NULL, the encoding is pre-pended with a byte that contains a zero for NULL entries and a one for non-NULL entries. For instance, a two byte unsigned integer can be encoded utilizing three bytes with the first byte 0 for NULLs and 1 in all other cases.

D) For fixed-length columns, multiple columns in a key can be handled by simply appending the values to be memory-compared together in the order of their position in the key. Variable-length column data is slightly more complex but can be handled by utilizing schemes as described in A(3) and A(4) above. Specifically, these schemes can find efficient ways to memory-compare these values in the correct order, by subdividing the string and inserting markers after each sub-section to compare in binary order.

E) This is sufficient to compare two keys within the row position component 308, encoded using the same schema, using a memory compare—this is understood and appreciated to be a relatively efficient operation for database systems.

An example of utilizing the above encoding scheme is depicted below:
   CREATE TABLE T1 (col1 unsignedI4, col2 unsignedI1 NOT NULL) INSERT INTO T1 (col1, col2) VALUES (32000, 255);

The key for this row, using the example encoding described above, can be:
   [NULL(1), I4ENCODING(4), I1ENCODING(1)] [0x00, 0x00007D00, 0xFF]

The following section is an example of the query component 302, the advanced key generator 306, and the row position component 308 utilized together to provide efficient cursoring and/or paging of query results. It is to be appreciated and understood that the following is an example and the claimed subject matter is not so limited. The query component 302 combines "Advanced Key Generation" techniques over relational operators implemented by the advanced key generator 306, a memory-comparable encoding scheme for keys over data implemented by the row position component 308, and file storage system and/or database cursors to provide an efficient and scalable technique to navigate results of a query. Below is a description on how to use these building blocks to perform such navigation.

The query component 302 provides additions to a query language such as the following: 1) a mechanism to describe the columns in the output that comprise a key; and 2) a mechanism to allow queries to reference the key encoding in comparisons. The description of columns in the output that comprise a key (e.g., 1) can be supported in several database application program interfaces (APIs). The API allows users to interrogate the metadata for a query result and determine which columns, if any, comprise a key. As this API does not expose the individual query operators, it is possible to simply extend the internal key determination logic to expose key columns over queries containing more complex operators as well. It is to be appreciated that the system 300 is not specific to this API—any other suitable API(s) can support this concept as well. The allowance of queries to reference the key encoding in comparisons (e.g., 2) can be accomplished by introducing a function for the user to call to reason about the current row's position within the sort order. For example (using a key encoding table):

SELECT * FROM T1 WHERE ORDERFUNC(col1, col2)>ORDERFUNC(32000, 255) ORDER BY col1, col2

If a function called "ORDERFUNC" is introduced to allow values from the query's presentation sort order to be used, the query results can be qualified to return rows that can come after the row in the query result. In this example, any rows after (32000, 255) would be returned. An alternative and equivalent encoding can return the binary encoding itself to the client. In either case, the key inputs are utilized to generate queries that can return a portion of the query results to the user. This represents the "row currency" from a traditional cursor model, but it does not require any specific state to be stored on the database server to maintain this currency. Specifically, the following is provided by the claimed subject matter: 1) no locks need to be held; 2) no cursor currency state needs to be stored on the server; and 3) there is no requirement to notify the client when rows are inserted, updated, or deleted (unless desired).

The following example demonstrates how the above (e.g., the system 300 and included components) can be utilized to page through results of a query.

1. First query: "SELECT TOP 40 * FROM T1 ORDER BY col1, col2;"
2. Client records the key for the last row (values for col1, col2). If less than 40 rows returned, then there is only one page. Otherwise, these values are used in subsequent paging queries. It is to be appreciated and understood that the stored state is sometimes called the "anchor."
3. Next page query: "SELECT TOP 40 * FROM T1 WHERE ORDERFUNC(@anchorcol1, @anchorcol2)< ORDERFUNC(col1, col2)" where @anchorcol1 and @anchorcol2 are parameters representing the values stored in (2). This returns the next 40 rows. The last row's values are then stored as the next anchor. The user can proceed again at step (2).

It is to be appreciated that the query component 302 and associated techniques and/or components are not limited to the specific SQL utilized—for example, TOP is a construct that exists in SQL Server but is not part of the ANSI standard. Other techniques to limit row counts can be utilized instead. For example, both some servers and/or products support a ROW_NUMBER( ) function that can be used to number rows in a result based on a particular order—this could also be used and implemented in accordance with the claimed subject matter.

If the system 300 and/or the technique is used over unique keys, the results can be binary ordered and each encoded key can be unique. Therefore, this can be used to iterate over the set of rows. User currency is maintained between rows without requiring physical resources on the server, so it is possible to scale this technique to support a large number of concurrent cursors because fewer server resources are required (e.g., only the cursor query plans or their equivalents can be required).

Cursors can have special case logic to handle changes from other users or from the user of the cursor. For example, an attempt to delete the current row in a traditional cursor would have to move to a different row and establish currency on that row as part of the deletion operation. Similarly, attempts by someone else to delete a row on which a cursor exists can be either prevented or handled. Since this cursor model can be based purely on the logical domain of the user data, deletion of the current row does not invalidate the "next page query" described in the claimed subject matter—it will find the next 40 rows (a page) from the current position in the logical space, even if the current row has been deleted or any other rows have been deleted between the previous call and next call by the user.

The following example demonstrates a case that can not be supported by existing and/or conventional cursor models using the techniques described in the claimed subject matter.

Figure 4:
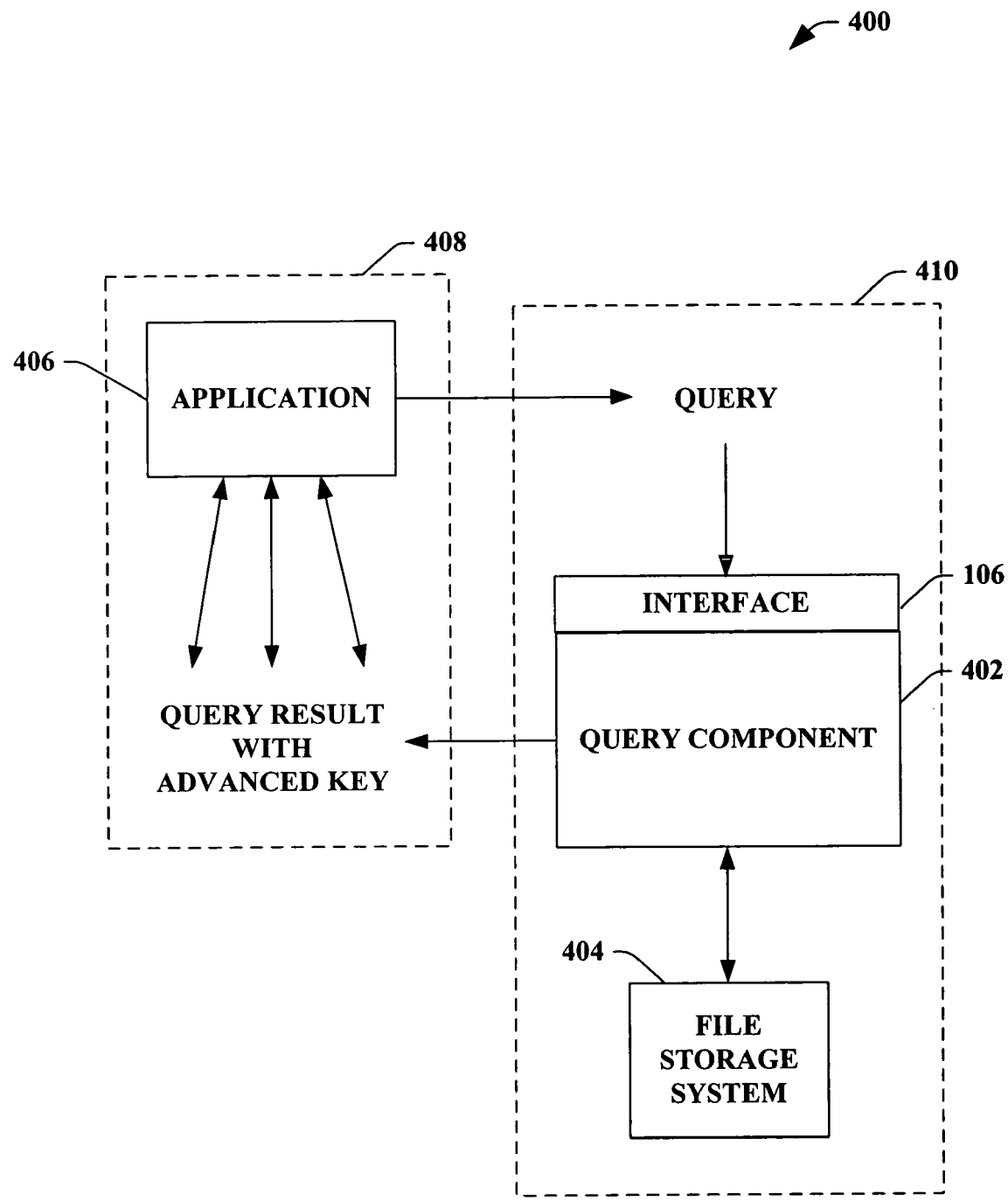
FIG. 4 illustrates a block diagram of an exemplary system that facilitates efficient cursoring over a set of query operations on a query result in a client-server environment.

CREATE TABLE T1(col1 int NOT NULL, col2 int NOT NULL) SELECT col1, SUM(col2) as sumcol2 FROM T1 GROUP BY col1 WITH ROLLUP This SELECT query outputs a key over col1 that can be used to identify output rows. For ease of notation, this can be packed and/or wrapped into a view definition for the rest of the example:

CREATE VIEW V AS SELECT col1, SUM(col2) as sumcol2 FROM T1 GROUP BY col1 WITH ROLLUP Now the paging queries can be written as:
First query:
SELECT TOP 40 * FROM V ORDER BY col1;

Subsequent queries use the last returned value from col1 from the first query as input into the following queries:

SELECT TOP 40 * FROM V WHERE ORDERFUNC (col1)>ORDERFUNC(@anchorcol1) ORDER BY col1;

FIG. 4 illustrates a system 400 that facilitates efficient cursoring over a set of query operations on a query result in a client-server environment. A query component 402 can provide an efficient cursoring and/or paging on a query result based at least in part upon the utilization of a key that is associated with the original data in a file storage system 404. For example, the query component 402 expands query operators such that a key associated with the query can be implemented to cursor. Moreover, an application 406 can provide a query on a set of data included within the file storage system 404, wherein the application 406 can receive a query result that is intended to be cursored and/or paged. In particular, the query component 402 can provide a query result with an advanced key that can be cursors and/or paged utilizing a plurality of query operators. It is to be appreciated that the query component 402, the file storage system 404, and the application 406 can be substantially similar to previous components and/or applications discussed in previous figures.

The system 400 allows the manipulation of query results by cursoring and/or paging on such results in such a technique that does not disturb data associated with the file storage system 404. A client-side 408 is implemented that can be segregated from a server-side 410, wherein the cursoring of query results related to data within the file storage system is undisturbed. In other words, the client-side 408 and the server-side 410 can be separate entities that can provide data integrity between data associated with cursoring query results, query results, and data within the file storage system 404. It is to be appreciated that the client-side 408 and the server-side 410 can be implemented over any suitable network and/or computer environment utilizing, for example, the Internet, WLAN, LAN, etc.

Figure 5:
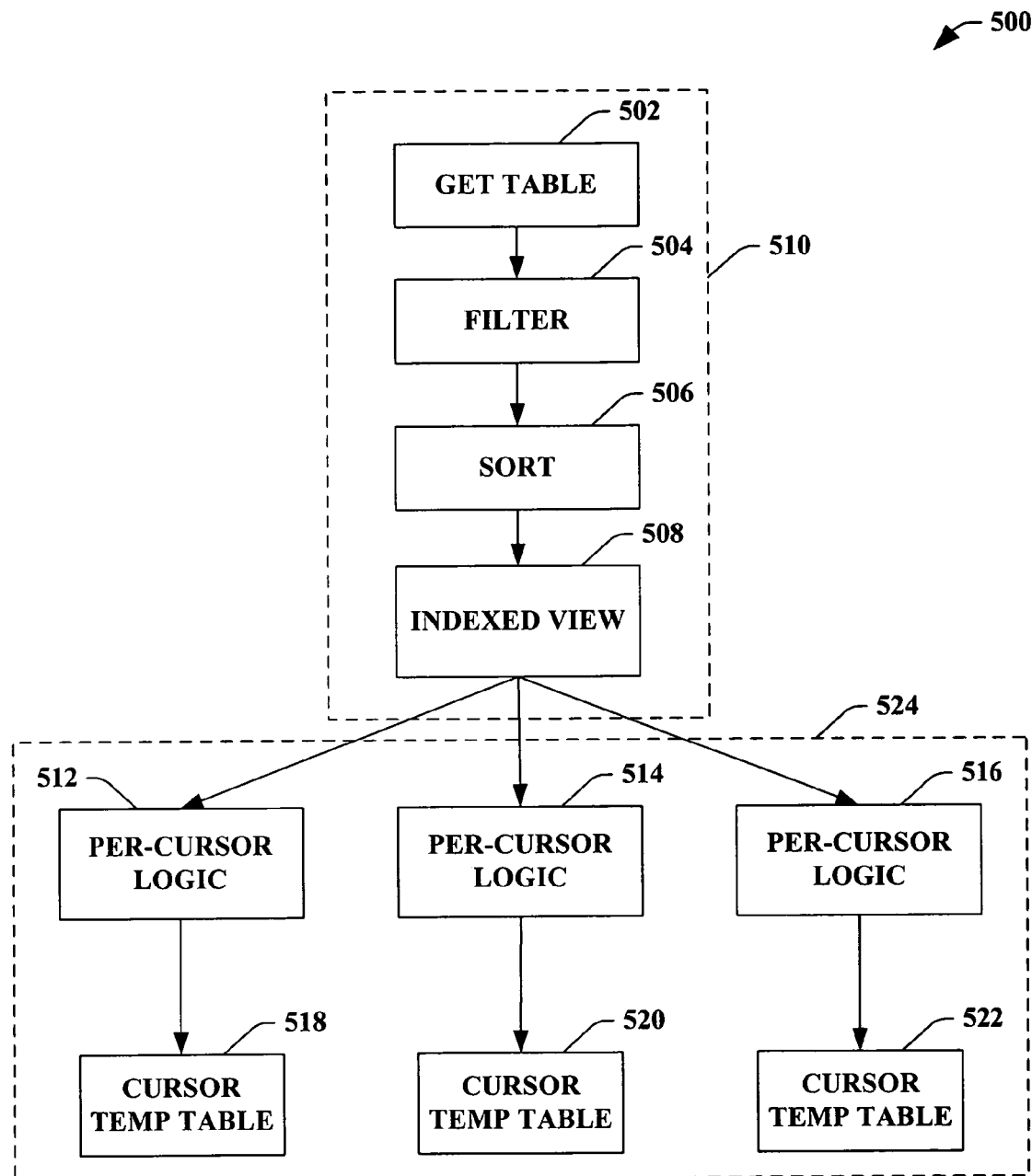
FIG. 5 illustrates a block diagram of an exemplary architecture that facilitates efficiently cursoring query results utilizing dynamic and keyset cursor techniques.

FIG. 5 illustrates a system 500 that facilitates efficiently cursoring query results utilizing dynamic and keyset cursor techniques. The previously described components and/or systems allow the utilization of a temporary table to store a list of keys, wherein the membership of the set can be dynamic. The dynamic membership can be achieved through annotations on each query operator and leverage the delta stream logic utilized to maintain indexes, indexed views, and to fire query notifications. The architecture 500 allows for indexed views to pre-compute the portion of the query that can be shared between cursors. Moreover, the sort can be populated once and shared among multiple cursors.

The architecture 500 provides a get table function 502 that can be filtered by a filter 504 (e.g., IS OF <type>, Path Restriction, and any user restrictions). After the filter 504, the data can be sorted by a sort 506 and then subsequently, at least one indexed view 508 can be provided. It is to be appreciated that the get table 502, the filter 504, the sort 506, the indexed views 508 can be considered part of a shared state 510. The indexed views 508 can be shared for all users of a sort. Additionally, the indexed views 508 can be associated with a plurality of per-cursor logic, as depicted by per-cursor logic 512 (associated with cursor temp table 518), per-cursor logic 514 (associated with cursor temp table 520), and per-cursor logic 516 (associated with cursor temp table 522).

Figure 6:
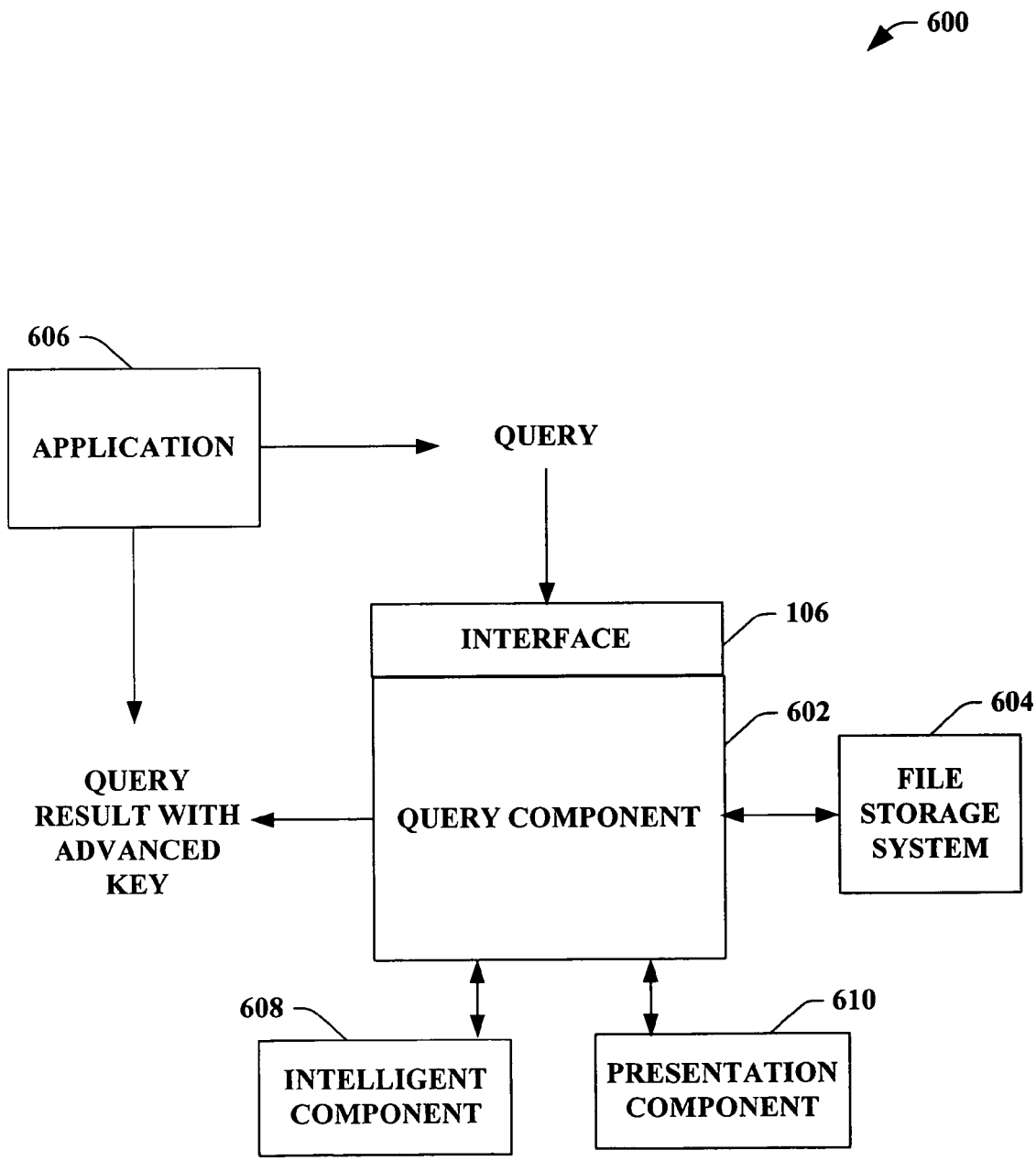
FIG. 6 illustrates a block diagram of an exemplary system that facilitates efficiently paging over query results associated with a file storage system.

FIG. 6 illustrates a system 600 that employs intelligence to facilitate efficiently paging over query results associated with a file storage system. The system 600 can include a query component 602, a file storage system 604, and a application 606 that can all be substantially similar to respective components, systems, and applications described in previous figures. The system 600 further includes an intelligent component 608. The intelligent component 608 can be utilized by the query component 602 to facilitate efficiently cursoring a query result in association with the previously described examples.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 610 can provide various types of user interfaces to facilitate interaction between a user and any component coupled to the query component 602. As depicted, the presentation component 610 is a separate entity that can be utilized with the query component 602. However, it is to be appreciated that the presentation component 610 and/or similar view components can be incorporated into the query component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the query component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
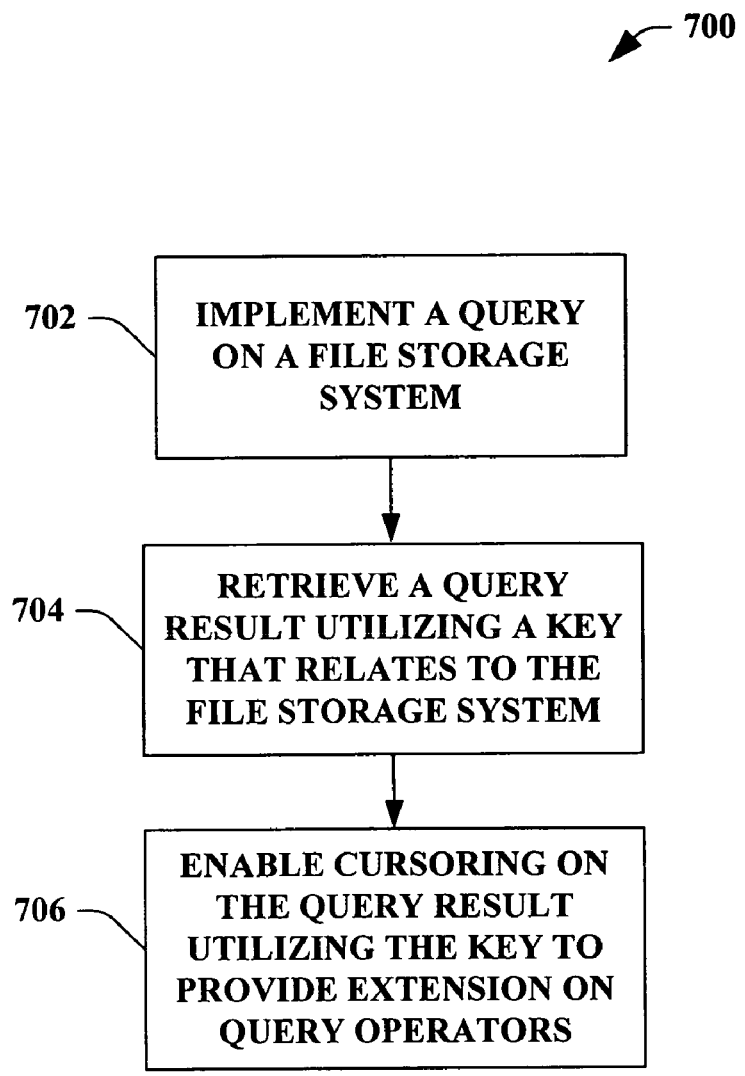
FIG. 7 illustrates an exemplary methodology for enabling an efficient cursoring and/or paging of query results associated with a file storage system.
Figure 8:
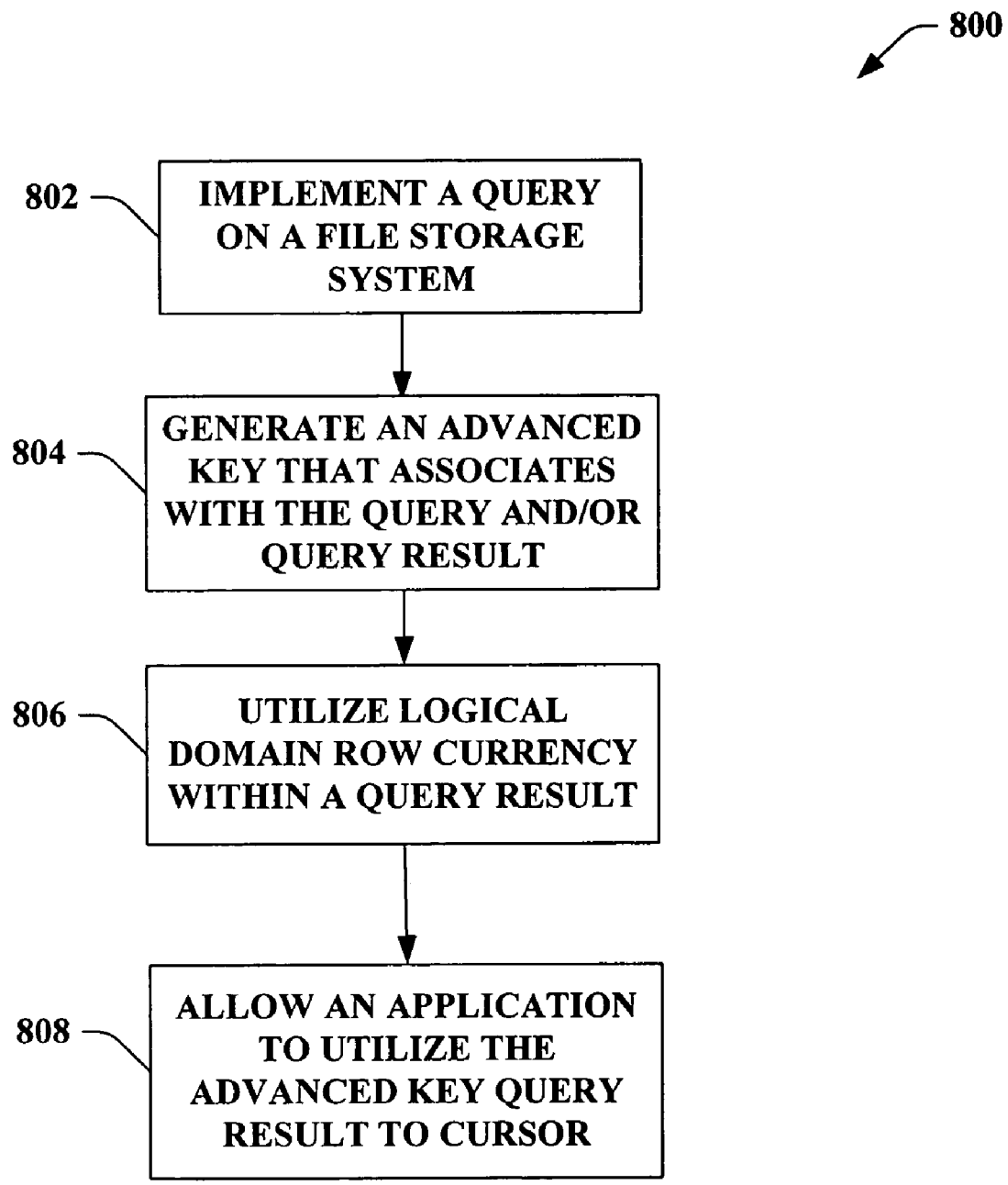
FIG. 8 illustrates an exemplary methodology that facilitates enabling an application to cursor over results of a query utilizing a key associated with original data.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 7 illustrates a methodology 700 for enabling an efficient cursoring and/or paging of query results associated with a file storage system. At reference numeral 702, a query can be implemented on a file storage system that includes data. The file storage system can be any suitable file system such as, but not limited to, a database system, an object relational database system, a database-based file storage system (e.g., wherein the representation of information can be defined as complex types), structured data system, unstructured data system, etc. At reference numeral 704, a query result can be retrieved utilizing a key that relates to the data and/or the file storage system. At reference numeral 706, cursoring is enabled on the query result utilizing the key (e.g., associated with the original data) to provide extended query operators. In other words, the method 700 enables cursoring and/or paging over any set of query operations on which a key can be surfaced and/or manufactured from the original data. By utilizing such method, the set of supported query operators is extended to include operators that generate keys in their output (e.g., Rollup, Group By, Sequenced Functions, . . . ) in addition to operators that maintain keys in their output (e.g., join, filter, projection, . . . ).

FIG. 8 illustrates a methodology 800 that facilitates enabling an application to cursor over results of a query utilizing a key associated with original data. At reference numeral 802, a query can be utilized to search on a file storage system, wherein the file storage system can be, but is not limited to, a database system, an object relational database system, a database-based file storage system (e.g., wherein the representation of information can be defined as complex types), structured data system, unstructured data system, etc. At reference numeral 804, an advanced key can be generated and/or derived over logical query processor operation trees for more advanced operators. At reference numeral 806, a logical domain row currency with a query result is implemented in order to reason the logical domain row position therewith. At reference numeral 808, an application can utilize the query result with advanced key and/or the logical domain row currency in order to cursor. It is to be appreciated that the application can be, but is not limited to, client database applications (e.g., email clients, file system clients, database applications, pure database applications, . . . ), and web applications (e.g., online catalogs that display pages of data, . . . ).

Figure 9:
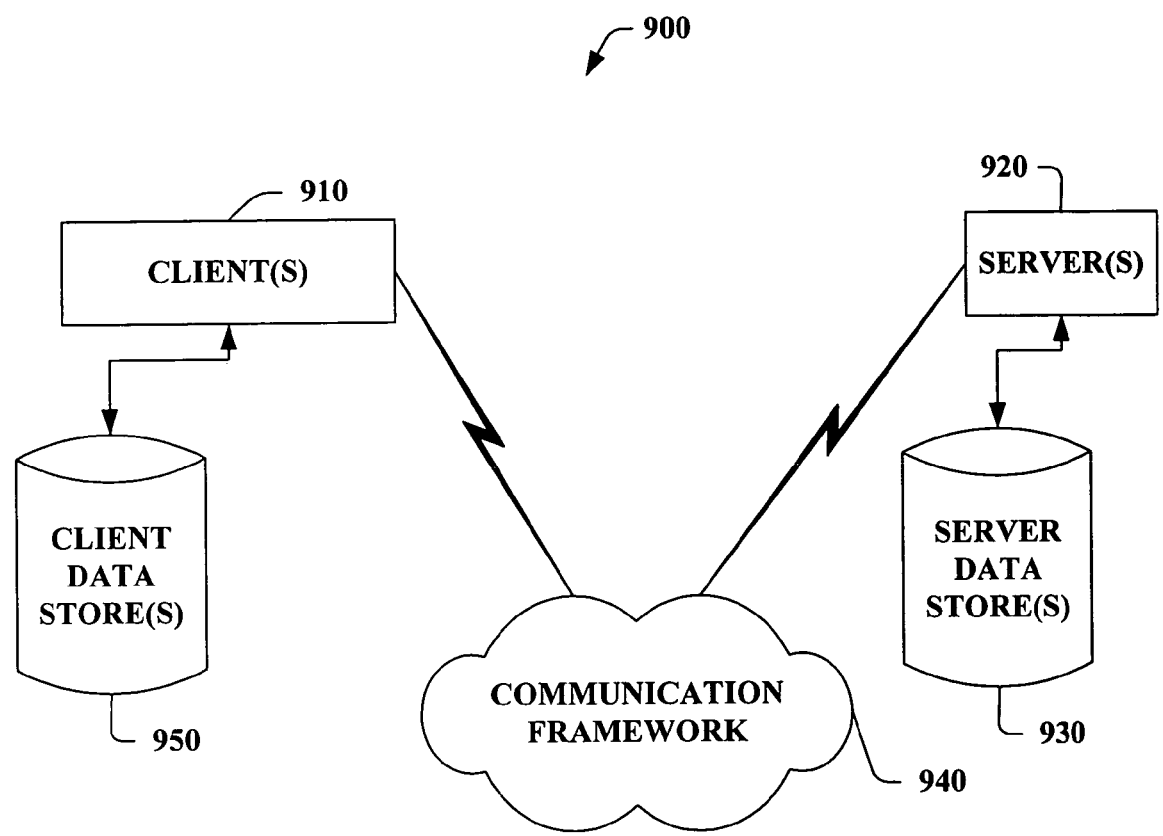
FIG. 9 illustrates an exemplary networking environment, wherein the novel aspects of the claimed subject matter can be employed.
Figure 10:
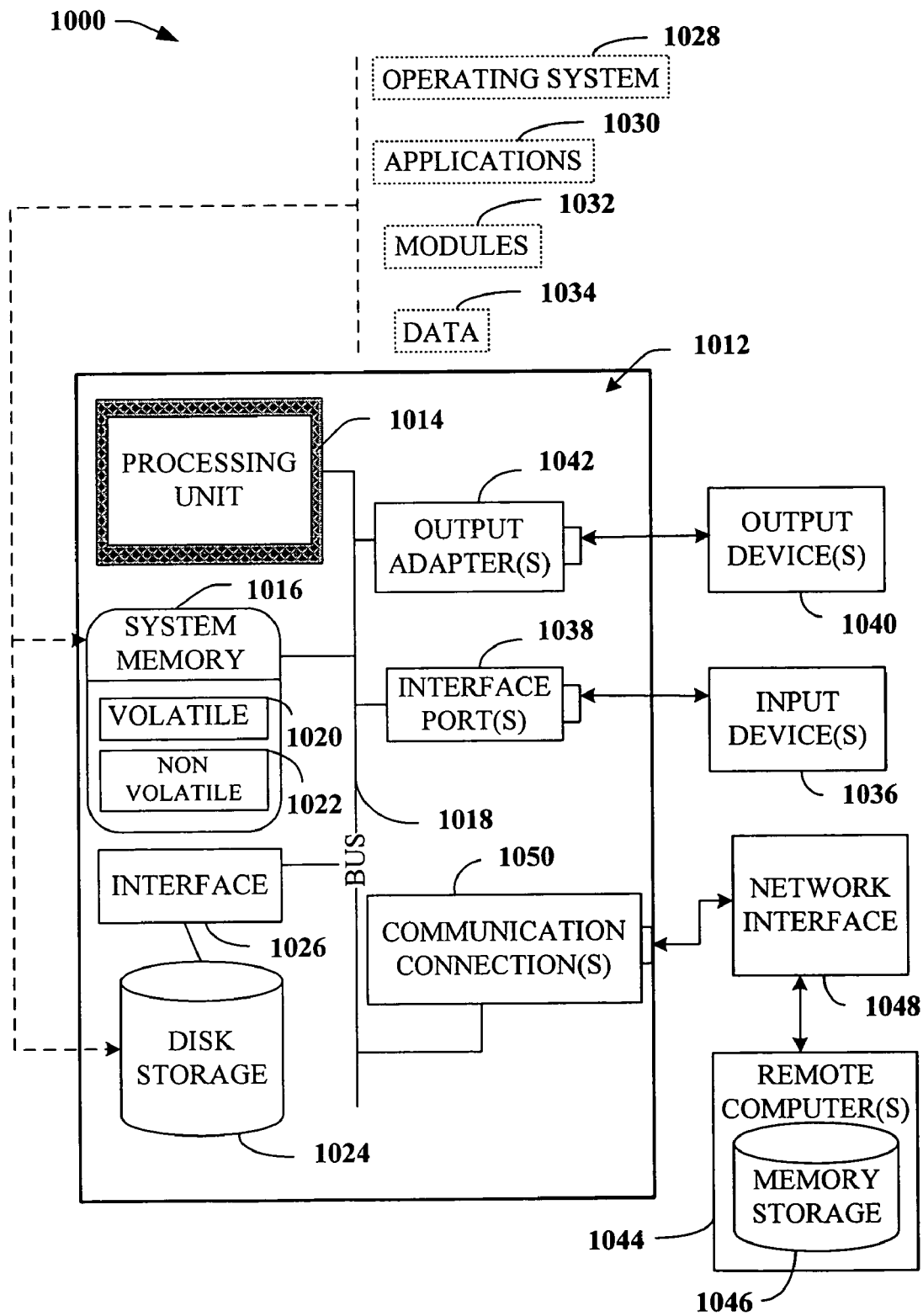
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that facilitates paging over the results of a query, comprising:
   at least a processor; and
   a memory that retains a file storage system and code instructions, at least a portion of the code instructions when executed by at least the processor implement the following components:
      an interface component that receives the query targeted to the file storage system including a key that relates to data; and
      a query component that performs at least the following:
         generates a query result that includes an advanced key, wherein the advanced key is derived from the result of the query, but is not maintained from the input of the query, the advanced key comprising a value from one or more columns of each row in the query result that uniquely identifies each row in the query result;
         stores, using a row position component, the advanced key to maintain logical domain row currency without requiring the storage of the state of the file storage system, wherein the row position component maps a three-valued logic in the query into a two-valued representation of values utilized in a sort order; and
         processes requests for cursoring and paging on the query result over a set of query operations utilizing the advanced key that uniquely identifies each row in the query result, wherein cursoring includes querying the query result and paging includes forward scrolling, backward scrolling, and bookmark positioning.

2. The system of claim 1, further comprising an application that provides the query and cursors on the query result utilizing the advanced key.

3. The system of claim 2, wherein the application is at least one of the following: a client database application; an email client; a file system client; a database application; a pure database application; a web application; and an online catalog that displays data.

4. The system of claim 1, wherein the file storage system is at least one of the following: a database system; an object relational database system; a database-based file storage system that represents information as complex types; a structured data system; and an unstructured data system.

5. The system of claim 1, wherein query operators for which an advanced key is derived from the query result but not maintained from the input of the query include: the Rollup, Group By, and Sequence functions.

6. The system of claim 1, wherein the two-valued representation is utilized to compare at least one key related to a column.

7. The system of claim 1, wherein the row position component provides an ascend and a descend sort; variable-length data; a multiple column key; and an efficient comparison.

8. The system of claim 1, wherein the query component, the interface, and the file storage system runs on a server-side and an application that utilizes the query result with the advanced key to cursor runs on a client-side.

9. A computer-implemented method that facilitates paging over the results of a query, the method comprising:
   employing a processor to execute code instructions retained in a memory, the code instructions when executed by the processor effect acts comprising:
      generating a query result that includes an advanced key, wherein the advanced key is derived from the result of the query, but is not maintained from the input of the query, the advanced key comprising a value from one or more columns of each row in the query result that uniquely identifies each row in the query result;
      storing the advanced key to maintain logical domain row currency without requiring the storage of the state of the file storage system;
      mapping a three-valued logic in the query into a two-valued representation of values utilized in a short order; and
      processing requests for cursoring and paging on the query result over a set of query operations utilizing the advanced key that uniquely identifies each row in the query result, wherein cursoring includes querying the query result and paging includes forward scrolling, backward scrolling, and bookmark positioning.

10. The method of claim 9, the acts further comprising:
    generating the advanced key over a logical query processor operation tree.

11. A computer storage medium storing computer executable instructions which when executed by a processor perform the following acts:
    generating a query result that includes an advanced key, wherein the advanced key is derived from the result of the query, but is not maintained from the input of the query, the advanced key comprising a value from one or more columns of each row in the query result that uniquely identifies each row in the query result;
    storing the advanced key to maintain logical domain row currency without requiring the storage of the state of the file storage system;
    mapping a three-valued logic in the query into a two-valued representation of values utilized in a sort order; and
    processing requests for cursoring and paging on the query result over a set of query operations utilizing the advanced key that uniquely identifies each row in the query result, wherein cursoring includes querying the query result and paging includes forward scrolling, backward scrolling, and bookmark positioning.

12. The method of claim 9 wherein the cursoring comprises keyset cursoring.

* * * * *

UNITED STATES PATENT AND TRADEMARK OFFICE
CERTIFICATE OF CORRECTION

PATENT NO. : 7,761,451 B2  
APPLICATION NO. : 11/156148  
DATED : July 20, 2010  
INVENTOR(S) : Conor Cunningham Page 1 of 1

It is certified that error appears in the above-identified patent and that said Letters Patent is hereby corrected as shown below:

In column 20, line 20, in Claim 9, delete "short" and insert -- sort --, therefor.

Signed and Sealed this
Twenty-fourth Day of May, 2011

David J. Kappos
*Director of the United States Patent and Trademark Office*